United States Patent [19]

Gloor

[11] 4,295,278
[45] Oct. 20, 1981

[54] METHOD AND APPARATUS FOR MEASURING OUT A STRAND GUIDE ARRANGEMENT

[75] Inventor: Hans Gloor, Umiken, Switzerland

[73] Assignee: Concast AG, Zürich, Switzerland

[21] Appl. No.: 111,768

[22] Filed: Jan. 14, 1980

[30] Foreign Application Priority Data

Jan. 30, 1979 [CH] Switzerland .................. 883/79

[51] Int. Cl.³ .............................................. G01B 5/14
[52] U.S. Cl. ................................... 33/182; 33/143 L; 33/174 PA
[58] Field of Search ................ 33/182, 143 L, 147 L, 33/174 PA, 174 L

[56] References Cited

U.S. PATENT DOCUMENTS 3,895,446  7/1975  Orlov et al. ..................... 33/174 L
3,937,271  2/1976  Akiba et al. ........................ 33/182
3,939,568  2/1976  Gonos et al. ..................... 33/147 K
3,962,794  6/1976  Kima et al. ......................... 33/182
3,983,631  10/1976  Dutzler .............................. 33/147 K

FOREIGN PATENT DOCUMENTS 2639240  6/1977  Fed. Rep. of Germany ........ 33/182

Primary Examiner—Willis Little
Attorney, Agent, or Firm—Werner W. Kleeman

[57] ABSTRACT

The strand guide arrangement or roller apron of a continuous casting installation is measured with the aid of a measuring device. The mutual spacing of the roller apron tracks are determined by the measuring device, the obtained measurements results, during the passage of the measuring device through the strand guide arrangement, is initially stored and then recalled after passage of the measuring device has been completed.

4 Claims, 3 Drawing Figures

METHOD AND APPARATUS FOR MEASURING OUT A STRAND GUIDE ARRANGEMENT

BACKGROUND OF THE INVENTION

The present invention relates to a new and improved method and apparatus for measuring out a strand guide arrangement or roller apron of a continuous casting installation, wherein there is measured the mutual spacing of the tracks or paths of travel for the continuously cast strand defined by the strand guide arrangement.

To operate continuous casting installations the exact adjustment of the strand guide arrangement-paths of travel, governed by for instance oppositely situated rows of rollers, is important, since otherwise there can arise damage to the cast strand. Therefore, at certain time intervals there is measured the spacing of oppositely situated rolls and, when the need arises, such spacing is corrected.

Apart from manually measuring out the strand guide arrangement by means of a micrometer gauge there are known to the art methods and apparatuses which measure out a strand guide arrangement of a continuous casting installation by means of a measuring head which, for instance, is attached to a dummy bar, and thus, is drawn through the strand guide arrangement or roller apron. The measuring head is connected by means of a drag cable with an indicator or display instrument which displays the corresponding distances or spacing. What is disadvantageous with this system and technique is the presence of the cable which can lead to difficulties in operation. For instance, on the one hand it is easy for fracture or rupture locations to be formed at the cable, the length of which is appreciable in the case of continuous casting installations having large metallurgical lengths, and, on the other hand, due to the required sliding contacts at the cable rolls which serve for transmission of the electrical signals, there are frequently caused disturbances. In order to eliminate these difficulties the obtained data can be transmitted in a wireless fashion by radio from the strand guide arrangement to a receiver. However, with such data transmission difficulties arise, due to the screening effect of the steel mass of the continuous casting installation causing falsification of the signals. Also, this solution is complicated.

SUMMARY OF THE INVENTION

Therefore, with the foregoing in mind it is a primary object of the present invention to provide a new and improved method and apparatus for measuring out a strand guide arrangement in a manner not associated with the aforementioned drawbacks and limitations of the prior art proposals discussed above.

Another and more specific object of the present invention aims at providing a new and improved method and apparatus which avoids the previously discussed difficulties, and, in particular, enables obtaining in a simple and economical manner correct measurement data without disturbances.

A further object of the invention is to provide the possibility of evaluating a number of times the obtained signals, in order to thus obtain information or data throughout a larger time span concerning the condition of the continuous casting installation.

Now in order to implement these and still further objects of the invention, which will become more readily apparent as the description proceeds, the invention is manifested by the features that the obtained measuring or measurement values are first then stored after the measuring device has moved through the roller apron or strand guide arrangement and are only then recalled after completion of the movement or passage of such measuring device through the strand guide arrangement.

The apparatus of the invention is manifested by the features that there is provided a measuring device which can be moved through the tracks or paths of travel defined by the strand guide arrangement or roller apron. The measuring device is provided with measuring feelers and further contains an analogue-digital converter, a microprocesser system containing program and data storages or memories and an interface.

By virtue of the invention there is obtained the advantage that disturbances, caused by drag cables or the screening effect of the steel mass, can be avoided and there is obtained an exact measurement result. The measuring signal containing information concerning the mutual spacing of the strand guide tracks from one another, which are formed for instance by two rows of oppositely situated support and/or guide rolls or rolls of a straightening and withdrawal machine, can be obtained with a conventional device, for instance by means of feelers in the form of inductive displacement pickups and the like. It is possible to pull a suitable measuring trolley or car through the strand guide arrangement, for instance by means of a dummy bar. The storage of the determined data, after completion of the measurement upon passage through the strand guide arrangement, can be accomplished at conventional memory or storage elements or data carriers, such as typically for instance magnetic tapes, cassettes, punched cards or the like. After passage through the strand guide arrangement the measuring data can be read-out and evaluated and portrayed in any suitable fashion. For this purpose there can be used conventional compensation writers, printers and so forth.

Furthermore, there is realized the advantage that the measuring values which are stored, for instance, upon a magnetic tape can be portrayed as frequently as desired and in the most different form. This is particularly important for maintenance of the continuous casting installation, since in this manner it is possible to detect changes in the geometry of the roller apron or strand guide arrangement over a longer time span. When using semiconductor memories the measuring values remain unchanged until there is accomplished the next measuring travel of the measuring device.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
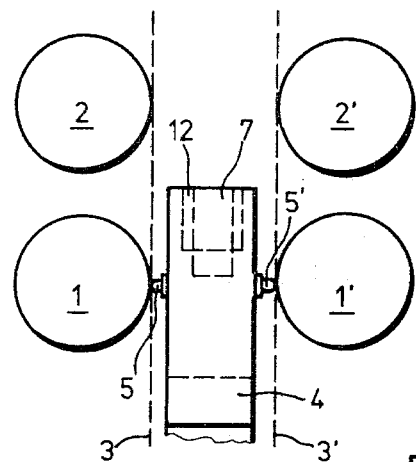
FIG. 1 is a fragmentary view of part of a strand guide arrangement or roller apron and illustrating in side view a measuring device for the practice of the invention.
Figure 2:
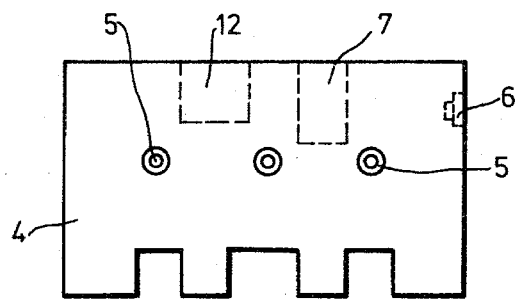
FIG. 2 is a front view of the measuring device.
Figure 3:
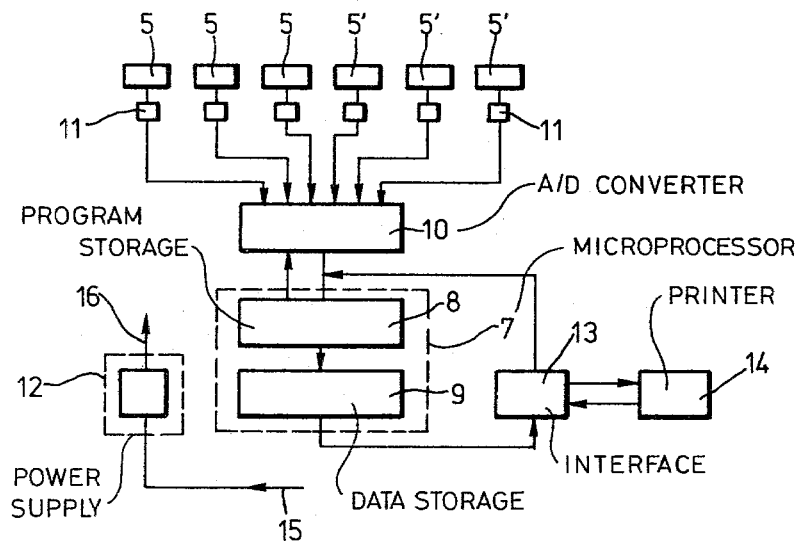
FIG. 3 is a simplified block circuit diagram of the measuring device.

Describing now the drawings, it is to be understood that the invention is used with any conventional continuous casting installation and therefore only enough of the structure thereof has been shown in the drawings, to simplify the illustration, as is needed for one skilled in the art to readily understand the underlying principles and concepts of this development. Turning attention now to FIGS. 1 and 2 there will be seen therein rolls or rollers 1 and 2 and oppositely situated rolls or rollers 1' and 2' which form the paths of travel or guide tracks 3 and 3', respectively, of a conventional roller apron or strand guide arrangement for a continuously cast strand, typically a steel casting. These rolls may be considered to be part of the support and guide framework and/or a withdrawal and straightening machine, as is conventionally used in the continuous casting technology. Between the oppositely situated rolls 1, 2 and 1', 2' there can be passed a measuring device 4, which for instance may be constructed to be part of a dummy bar head or a dummy bar chain element of a conventional dummy bar. Each side of the measuring device 4 confronting the related rolls 1, 2 and 1', 2', respectively, possesses for instance three inductive displacement or motion pickups 5 and 5', respectively, or equivalent structure. These inductive displacement pickups 5 and 5', constituting measuring elements, determine during the passage thereof between the rolls 1, 2 and 1', 2', the spacing of the guide tracks 3 and 3' of the strand guide arrangement from one another. The measuring device 4 furthermore contains a microprocessor system or microprocessor 7 containing a program storage or memory 8 and data storage or memory 9. The position of the six inductive displacement pickups 5 and 5', as shown in FIG. 3, are detected by an analogue-digital converter 10 connected with the processor system, where there is undertaken conversion of the displacement information or data to the system level in the accommodation modules 11. The analogue-digital converter 10 works in a multiplex system, i.e. the inductive displacement pickups are not simultaneously interrogated, rather in succession. The sampling rate is so great that the different sampling or sensing points of the individual displacement pickups do not produce any appreciable displacement path differences. Determination of the difference path for each pair of displacement pickups 5, 5' is undertaken at the processor. Reference character 6 designates an electrical cable connection.

Turning attention now to the block circuit diagram of FIG. 3 there is shown therein that the measuring or measurement values obtained from the inductive displacement pickups 5 and 5', after conversion in the analogue-digital converter 10, are infed to the microprocessor system 7 and there directly processed. By means of a series interface 13 it is possible to have a dual connection to a printer 14 by means of the cable connection 6. After passage of the measuring device through the continuous casting installation there is first stored for each roll pair the spacing of the related rolls. After connection of the printer 14 it is possible to print-out in table form or in any other suitable array the measurement or measuring data.

The equipment possesses its own current supply which is here shown in the form of a 12-volt accumulator 12 which supplies the equipment with current, by means of the outlet 16, for the duration of a measurement travel of the measurement device. During the rest or ineffectual intervals (storage or printing-out of the measurement results) the accumulator 12 is recharged with a charging voltage, schematically indicated by reference character 15, through a suitable power supply network or equivalent power supply means. The current consumption of the equipment is governed for the most part by the accommodation or adaptation modules 11 of the inductive displacement pickups 5, 5'. If there are employed modules having relatively low current power requirements, then the current consumption is in the order of about 1 ampere. In the case of an accumulator capacity of 6 Ah it is possible to then carry out measurement travels of the measuring device for a period of time lasting up to as much as about five hours.

Programing of the processor system enables roll identification and additionally furnishes an evaluatable program. The roll identification program permits eliminating all sampling or scanning signals during a measuring travel of the measuring device which are not predicated upon rolls which are to be measured. Since the velocity cannot be fixed during a measuring travel, the sampling rate is variable. Consequently, there is not required any predetermined throughpass velocity of the measuring device, but of course it cannot appreciably vary during a throughpass interval.

The evaluation program furnishes a report in each case concerning the last measurement travel of the measuring device, and apart from the roll number there can be printed-out the results for the three pairs of feelers or pickups. Furthermore, there can be interrogated data and test run number. When using the equipment for different continuous casting installations having different numbers of rolls it is possible to introduce into the memory or storage the roll number by means of a printer device. Equally, it is possible to introduce minimum distances if there should be detected contact rolls which for instance serve to convey or throughfeed the measuring device. Such contact rolls directly come into rolling contact with the measuring head, with the result that there is dropped below a lower threshold or boundary value for the roll spacing, so that these rolls can be eliminated.

While there are shown and described present preferred embodiments of the invention, it is to be distinctly understood that the invention is not limited thereto, but may be otherwise variously embodied and practised within the scope of the following claims. ACCORDINGLY,

What I claim is:

1. An apparatus for measuring out a strand guide arrangement of a continuous casting installation, comprising:

means providing a strand guide arrangement defining guide tracks arranged at a mutual spacing from one another;

a measuring device provided with measuring feeler means capable of moving along the guide tracks of the strand guide arrangement; and said measuring device comprising:

analogue-digital converter means operatively connected with said measuring feeler means;

microprocessor means containing program means and data storage means connected with said analogue-digital converter means, said storage means being displaced with the measuring means through the guide arrangements; and interface means operatively connected with said microprocessor means.

2. A method of measuring out a strand guide arrangement of a continuous casting installation for strands, comprising the steps of:

providing means defining guide tracks for the continuously cast strand which are spaced from one another;

measuring by means of a measuring device the mutual spacing of the guide tracks from one another by passing the measuring device along the strand guide arrangement to obtain measuring values;

storing the measuring values obtained by the measuring device simultaneously with the displacement of said measuring device by means of a storing device which is directly connected to and displaced with the measuring device through the guide arrangements; and recalling the stored measuring values after the measuring device has completed its passage through the strand guide arrangement.

3. The method as defined in claim 1, further including the steps of:

storing the measuring values upon a data carrier.

4. The method as defined in claim 3, further including the steps of:

employing as the data carrier a tape.

* * * * *